United States Patent
Sakata

(10) Patent No.: US 10,294,145 B2
(45) Date of Patent: May 21, 2019

(54) COATING COMPOSITION AND ELECTRONIC COMPONENT

(71) Applicant: Murata Manufacturing Co., Ltd., Kyoto-fu (JP)

(72) Inventor: Tomonori Sakata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/868,412

(22) Filed: Jan. 11, 2018

(65) Prior Publication Data

US 2018/0134611 A1 May 17, 2018

Related U.S. Application Data

(63) Continuation of application No. PCT/JP2016/066627, filed on Jun. 3, 2016.

(30) Foreign Application Priority Data

Jul. 15, 2015 (JP) .................................. 2015-141490

(51) Int. Cl.

| | | |
|---|---|---|
| *C08F 2/46* | (2006.01) | |
| *C08F 2/50* | (2006.01) | |
| *C08G 61/04* | (2006.01) | |
| *C03C 8/16* | (2006.01) | |
| *H01B 3/02* | (2006.01) | |
| *C09D 7/61* | (2018.01) | |
| *C09D 133/12* | (2006.01) | |
| *H01B 3/12* | (2006.01) | |
| *C03C 3/091* | (2006.01) | |
| *C03C 8/02* | (2006.01) | |
| *C03C 12/00* | (2006.01) | |
| *C09D 133/08* | (2006.01) | |
| *C08K 3/40* | (2006.01) | |
| *C08K 3/22* | (2006.01) | |

(52) U.S. Cl.
CPC .............. *C03C 8/16* (2013.01); *C03C 3/091* (2013.01); *C03C 8/02* (2013.01); *C03C 12/00* (2013.01); *C09D 7/61* (2018.01); *C09D 133/08* (2013.01); *C09D 133/12* (2013.01); *H01B 3/02* (2013.01); *H01B 3/12* (2013.01); *C08K 3/40* (2013.01); *C08K 2003/2227* (2013.01)

(58) Field of Classification Search
CPC .... C03C 8/16; H01B 3/12; C09D 7/61; C09D 133/12
USPC .......... 522/39, 33, 6, 71, 1, 189, 184; 520/1
See application file for complete search history.

(56) References Cited

U.S. PATENT DOCUMENTS

2012/0164364 A1* 6/2012 Mehlmann .............. C08L 33/12
428/36.9

FOREIGN PATENT DOCUMENTS

| JP | H10-017614 A | 1/1998 |
|---|---|---|
| JP | 2000-001632 A | 1/2000 |
| JP | 2000-010276 A | 1/2000 |
| JP | 2001-092118 * | 4/2001 |
| JP | 2001-092118 A | 4/2001 |
| JP | 2001-210141 A | 8/2001 |
| JP | 2008-233901 A | 10/2008 |

OTHER PUBLICATIONS

Towata et al, JP 2001-092118 Machine Translation, Apr. 2, 2001 (Year: 2001).*
International Search Report issued in PCT/JP2016/066627; dated Sep. 6, 2016.
Written Opinion issued in PCT/JP2016/066627; dated Sep. 6, 2016.

* cited by examiner

*Primary Examiner* — Jessica Whiteley
(74) *Attorney, Agent, or Firm* — Studebaker & Brackett PC

(57) ABSTRACT

A coating composition contains 5 parts by mass or more and 20 parts by mass or less (i.e., 5 to 20) of a first resin composition, 5 parts by mass or more and 20 parts by mass or less (i.e., 5 to 20) of a second resin composition, and 40 parts by mass or more and 65 parts by mass or less (i.e., 40 to 65) of an inorganic powder. The first resin composition is a poly(meth)acrylate with a glass transition temperature Tg of $\leq -20°$ C., and the second resin composition is a compound having structures represented by general formulae (1) and (2), below, one or more structures for each. $R^1$, in general formula (1), and $R^2$, in general formula (2), are each independently a hydrogen atom or a methyl group. X, in general formula (2), is any substituent that is not a hydrogen atom.

[Chem. 1]

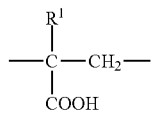

(1)

[Chem. 2]

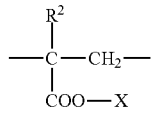

(2)

20 Claims, 2 Drawing Sheets

COATING COMPOSITION AND ELECTRONIC COMPONENT

CROSS-REFERENCE TO RELATED APPLICATIONS

This application claims benefit of priority to International Patent Application No. PCT/JP2016/066627, filed Jun. 3, 2016, and to Japanese Patent Application No. 2015-141490, filed Jul. 15, 2015, the entire contents of each are incorporated herein by reference.

BACKGROUND

Technical Field

The present disclosure relates to a coating composition and to an electronic component.

Background Art

Insulating pastes that contain inorganic components including a glass powder and an organic component are used as insulating material in a board, such as a multilayer circuit board, and in an electronic component.

In Japanese Unexamined Patent Application Publication No. 2001-210141, a photosensitive glass paste comprising: an inorganic component comprising a glass powder; and a photosensitive organic component, wherein the glass powder comprises: (a) 1 to 30 percent by weight of a low melting point glass powder having a glass softening point (Ts) in the range of 400° C. to 600° C.; and (b) 70 to 99 percent by weight of high melting point glass powder having a glass softening point (Ts) at least 300° C. higher than the glass softening point of the low melting point glass is disclosed.

Specifically, it is composed of an inorganic powder mainly composed of glass: 50 parts by weight, a copolymer of methyl methacrylate and methacrylic acid: 7 parts by weight, a monomer (EO-modified trimethylolpropane triacrylate): 14 parts by weight, an initiator: 2 parts by weight, and a solvent (ethyl carbitol acetate): 27 parts by weight. With a photosensitive glass paste configured as such, the disclosure states, it becomes possible to control defects such as shrinkage upon sintering, the diffusion of conductor components, such as Ag, and gelation, and to reliably form a glass layer having via holes of desired dimensions.

SUMMARY

When an insulating paste containing a glass powder is used to produce an electronic component, it is needed that the coating surface be as smooth as possible from the viewpoint of, for example, insulation reliability.

When a known insulating paste is used, the coating is formed mainly by the screen printing method, and there has been the problem of air bubbles and unevenness occurring in the coating surface immediately after application because of the effect of the mesh of the screen plate.

This appears to be because in the prior art, with an insulating paste that contains a glass powder (especially 20 parts by mass or more), it is difficult to level (smoothen) it within the period from coating application to the completion of solvent drying because of poor fluidity.

In particular, when the manufacturer wants to make the coating formation thickness as large as 30 μm or more, it is needed to use a screen plate with a large mesh diameter, and there has been the problem of noticeable occurrence of air bubbles and unevenness.

Regarding the reason for the poor fluidity of an insulating paste containing a glass powder, the poor fluidity was considered to be because viscosity increases and the fluidity of the paste declines during solvent drying, and because hydroxyl groups are easily formed on the surface of the glass powder, and the fluidity of the glass powder deteriorates owing to interactions between the hydroxyl groups.

For these reasons, with the photosensitive glass paste disclosed in Japanese Unexamined Patent Application Publication No. 2001-210141, there has been the possibility that the coating surface may be unsmooth when, for example, a coating with a thickness of approximately 50 μm is formed.

The present disclosure was made to solve the above problems and is intended to provide a composition for forming a coating with which a coating with a smooth coating surface can be formed even if the coating formation thickness is set large.

To achieve this object, a composition according to the present disclosure for forming a coating contains, at least, 5 parts by mass or more and 20 parts by mass or less (i.e., from 5 parts by mass to 20 parts by mass) of a first resin composition, 5 parts by mass or more and 20 parts by mass or less (i.e., from 5 parts by mass to 20 parts by mass) of a second resin composition, and 40 parts by mass or more and 65 parts by mass or less (i.e., from 40 parts by mass to 65 parts by mass) of an inorganic powder.

The first resin composition is a poly(meth)acrylate with a glass transition temperature Tg of ≤−20° C., and the second resin composition is a compound having structures represented by general formulae (1) and (2), below, one or more structures for each.

[Chem. 1]

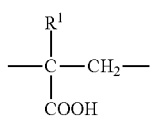

(1)

[Chem. 2]

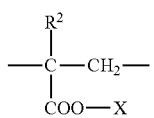

(2)

($R^1$, in general formula (1), and $R^2$, in general formula (2), are each independently a hydrogen atom or a methyl group. X, in general formula (2), is any substituent that is not a hydrogen atom.)

The composition according to the present disclosure for forming a coating contains at least two resin compositions. The first resin composition has a Tg of −20° C. or lower and is liquid. Thus, even if the solvent content decreases through drying after coating application, it is unlikely that the viscosity of the composition for forming a coating increases, allowing the composition to maintain fluidity. With such characteristics, the first resin composition contributes to the smoothing of the coating surface following the composition for forming a coating is applied and dried.

The carboxyl group of the second resin composition has good wettability with hydroxyl groups existing on the surface of the inorganic powder and therefore improves the fluidity of the inorganic powder by adhering to the surface of the inorganic powder and breaking the interactions (hydrogen bonds) between the hydroxyl groups on the inorganic powder. Furthermore, the structure of the portion represented by X in general formula (2) controls interactions between hydroxyl groups present on the surface of the inorganic powder and improves the fluidity of the inorganic powder by acting as a steric hindrance. That is, it appears that by adding the second resin composition, the static viscosity of the composition for forming a coating is reduced, helping the coating smoothen. With such characteristics, the second resin composition contributes to the smoothing of the coating surface following the composition for forming a coating is applied.

In the composition according to the present disclosure for forming a coating, X, in general formula (2), above, is preferably either a structure having a benzene ring or an alkyl group having eight or more carbon atoms. When X is either a structure having a benzene ring or an alkyl group having eight or more carbon atoms, the hydrophobicity of X is high, and its effectiveness as a steric hindrance is increased. Thus, it is possible to more effectively control interactions between hydroxyl groups on the surface of the inorganic powder, and to further increase the fluidity of the inorganic powder. As a result, the coating surface after the composition for forming a coating is applied is further smoothened.

In the composition according to the present disclosure for forming a coating, it is preferred that the weight-average molecular weight of the second resin composition be 50000 or less. When the weight-average molecular weight of the second resin composition is 50000 or less, the viscosity of the composition for forming a coating does not become high. Thus, it becomes easier to obtain a coating with a smooth surface. Furthermore, fluidity during heat drying becomes better.

The composition according to the present disclosure for forming a coating preferably further contains a (meth)acrylate having three or more and six or less (i.e., from three to six) ethylenically unsaturated groups in one molecule. Furthermore, the composition according to the present disclosure for forming a coating preferably further contains a photopolymerization initiator.

When an electronic component is produced using a composition according to the present disclosure for forming a coating, a step of cutting the electronic component with a dicing machine and/or a step of pattern formation may be involved. In the cutting with a dicing machine and the pattern formation, waterproofness and solvent resistance, respectively, are required.

To give the coating solvent resistance and waterproofness, it is needed to control the swelling of the coating caused by solvent and water, and for this purpose, it is recommended to make the coating a cured material with a high crosslinking density. Hence, it is preferred to give the composition for forming a coating thermosetting properties and photocurability, and when cured through thermal curing or photocuring, the composition for forming a coating gives a coating with superior waterproofness and solvent resistance.

As a result of the composition for forming a coating containing a (meth)acrylate having three or more and six or less (i.e., from three to six) ethylenically unsaturated groups in one molecule, the composition for forming a coating is thermally cured or photocured efficiently, giving a group cured material with a high crosslinking density. Furthermore, as a result of the composition for forming a coating containing a photopolymerization initiator, the efficiency of photocuring is improved.

For the composition according to the present disclosure for forming a coating, it is preferred that the inorganic powder be composed of glass and filler, and that the proportion that the filler accounts for in the inorganic powder be 60% by weight or less. When filler is contained in the inorganic powder, it is possible to improve coating strength. Furthermore, even if filler is contained as inorganic powder, it is possible to form a coating with a smooth coating surface, as a result of the first resin composition and second resin composition are contained in the composition for forming a coating.

An electronic component according to the present disclosure has an insulating layer that is a fired form of a composition according to the present disclosure for forming a coating. The insulating layer that is a fired form of a composition according to the present disclosure for forming a coating provides a smooth insulating layer. It therefore gives an insulating layer with superior insulation reliability, and insulation failures in the electronic component as a whole are prevented from occurring.

According to the present disclosure, a composition for forming a coating can be provided with which a coating with a smooth coating surface can be formed even if the coating formation thickness is set large.

DESCRIPTION OF EMBODIMENTS

Figure 1:
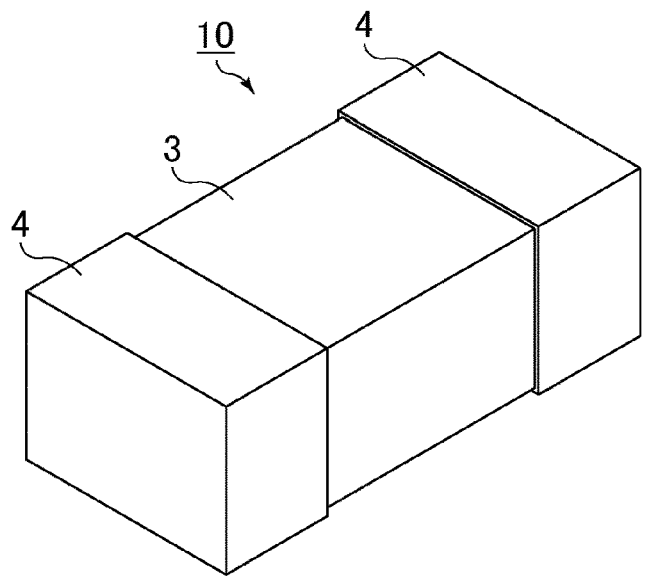
FIG. 1 is a perspective diagram that schematically illustrates an example of an electronic component.

The following describes a composition according to the present disclosure for forming a coating. However, the present disclosure is not limited to the configurations below and can optionally be applied with changes made thereto, unless the gist of the present disclosure is altered.

It is not worth mentioning that the individual embodiments presented below are examples, and partial replacement or combination of configurations presented in different embodiments is possible. A combination of two or more of the individual preferred configurations, described below, of the present disclosure is also the present disclosure.

A composition according to the present disclosure for forming a coating contains, at least, 5 parts by weight or more and 20 parts by weight or less (i.e., from 5 parts by weight to 20 parts by weight) of a first resin composition, 5 parts by weight or more and 20 parts by weight or less (i.e., from 5 parts by weight to 20 parts by weight) of a second resin composition, and 40 parts by weight or more and 65 parts by weight or less (i.e., from 40 parts by weight to 65 parts by weight) of an inorganic powder.

The first resin composition is a poly(meth)acrylate with a glass transition temperature Tg of $\leq -20°$ C., and the second resin composition is a compound having structures represented by general formulae (1) and (2), below, one or more structures for each.

[Chem. 3]

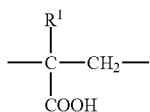
(1)

[Chem. 4]

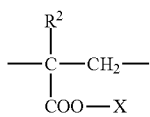
(2)

($R^1$, in general formula (1), and $R^2$, in general formula (2), are each independently a hydrogen atom or a methyl group. X, in general formula (2), is any substituent that is not a hydrogen atom.)

The first resin composition is a poly(meth)acrylate with a glass transition temperature Tg of ≤−20° C. Specific examples include poly n-butyl acrylate (Tg: −54° C.), polyethyl acrylate (Tg: −24° C.), poly 2-ethylhexyl acrylate (Tg: −70° C.), polyoctyl acrylate (Tg: −65° C.), and polynonyl acrylate (Tg: −58° C.).

Alternatively, the first resin composition can be one obtained by using n-butyl acrylate, ethyl acrylate, 2-ethylhexyl acrylate, 2-octyl acrylate, and nonyl acrylate as monomeric components constituting the first resin composition and copolymerizing these in any combination. Furthermore, it is also possible to use one in which another acrylic monomer has been copolymerized to introduce a hydroxyl group or a carboxyl group into the side chain, or one in which a methacrylate has been copolymerized for the adjustment of characteristics. Note that in this description, poly(meth)acrylate is a concept that includes polyacrylates, polymethacrylates, and copolymers of an acrylate and a methacrylate. The weight-average molecular weight of the first resin composition is preferably 1000 or more and 10000 or less (i.e., from 1000 to 10000).

Additionally, in this description, the weight-average molecular weights of the resin compositions (first resin composition and second resin composition) are molecular weights measured by the following method:

Reference standards: TSK Standard Polystyrenes (Tosoh Corporation)

Apparatus: High-speed GPC apparatus (HLC-8220 GPC, Tosoh Corporation)

Columns: TSK-GEL α-6000, TSK-GEL α-4000, and TSK-GEL α-2500 in series connection Eluent: Tetrahydrofuran Measuring temperature: 40° C.

Flow rate: 0.6 mL/min.

The second resin composition is a compound having a structure represented by general formula (1) and a more structure represented by general formula (2), one or more structures for each.

A structure represented by general formula (1) is a structure derived from a monomer of (meth)acrylic acid series, and a monomer of (meth)acrylic acid series is a monomer that has an acryloyl group or a methacryloyl group. If $R^1$, in general formula (1), is a hydrogen atom, the structure is an acryloyl group, and if $R^1$ is a methyl group, the structure is a methacryloyl group.

A structure represented by general formula (2) is a structure derived from a monomer in which the hydrogen atom in the carboxyl group in a monomer of (meth)acrylic acid series has been replaced with a different substituent. X is preferably a hydrocarbon group that may have a substituent. When X is a hydrocarbon group that may have a substituent, the structure represented by general formula (2) can be described as a structure derived from a monomer of (meth)acrylate series.

The hydrocarbon group more preferably has an alkyl group and even more preferably is a long-chain alkyl group having eight or more carbon atoms. Examples in the case in which X is an alkyl group include methyl, ethyl, propyl, butyl, pentyl, hexyl, heptyl, octyl, 2-ethylhexyl, nonyl, decyl, isodecyl, undecyl, lauryl, dodecyl, tridecyl, tetradecyl, pentadecyl, hexadecyl, heptadecyl, octadecyl, and other groups. Of these alkyl groups, long-chain alkyl groups having eight or more carbon atoms are octyl, 2-ethylhexyl, nonyl, decyl, isodecyl, undecyl, lauryl, dodecyl, tridecyl, tetradecyl, pentadecyl, hexadecyl, heptadecyl, and octadecyl.

Alternatively, the hydrocarbon group is more preferably a structure having an aromatic ring, such as a benzene ring or a naphthalene ring, even more preferably a structure having a benzene ring. Examples of structures that have a benzene ring include the phenyl and benzyl groups and other structures.

The second resin composition may have, in one molecule, multiple structures represented by general formula (1) and multiple structures represented by general formula (2), and may also be a copolymer of three monomers. For example, a copolymer of methacrylic acid, methyl methacrylate, and octyl methacrylate would have one structure represented by general formula (1) and two structures represented by general formula (2). The weight-average molecular weight of the second resin composition is preferably 50000 or less, more preferably 30000 or less, and is preferably 10000 or more.

An example of an inorganic powder is a glass powder and filler. The glass may have a 100% $SiO_2$ composition, but to increase the fluidity of the $SiO_2$ glass in that case, there arises a need to set the firing temperature relatively high. Thus, a component for lowering the softening point of the glass (e.g., boron, sodium, or potassium) may be added.

From this viewpoint, preferred proportions of the amounts of components in the glass are as follows:

$SiO_2$: 70% by weight or more and 100% by weight or less (i.e., from 70% by weight to 100% by weight)

$B_2O_3$: 0% by weight or more and 28% by weight or less (i.e., from 0% by weight to 28% by weight), a preferred lower limit being 3% by weight $Na_2O$: 0% by weight or more and 4% by weight or less (i.e., from 0% by weight to 4% by weight), a preferred lower limit being 1% by weight $K_2O$: 0% by weight or more and 4% by weight or less (i.e., from 0% by weight to 4% by weight), a preferred lower limit being 0.5% by weight $Al_2O_3$: 0% by weight or more and 2% by weight or less (i.e., from 0% by weight to 2% by weight), a preferred lower limit being 0.5% by weight $SiO_2$ representing 70% by weight or more is preferred because in this case, it is possible to increase the chemical resistance, such as plating resistance, of the coating formed while reducing the relative permittivity εr of the coating.

Preferred examples of compositions of the glass are the following examples:

$SiO_2:B_2O_3:Na_2O:K_2O=80.0:15.0:1.0:4.0$
$SiO_2:B_2O_3:Al_2O_3=96.5:3.0:0.5$
$SiO_2:B_2O_3:Na_2O:K_2O:Al_2O_3=80.5:13.0:4.0:0.5:2.0$
$SiO_2:B_2O_3:K_2O:Al_2O_3=70.0:28.0:1.0:1.0$

Furthermore, in the glass may be contained other impurities, and a preferred amount in the case in which impurities are contained is less than 5% by weight.

Regarding the glass powder, it is preferred to use one with a particle diameter ($D_{50}$ (arithmetic-mean particle diameter, median diameter)) of 0.3 μm or more and 2.0 μm or less. Note that $D_{50}$ is obtained as, for example, a value of a number average particle diameter as calculated by measuring the particle size distribution over the range of 0.02 μm or more and 1400 μm or less (i.e., from 0.02 μm to 1400 μm) by the laser diffraction/scattering method using BEL Microtrac MT 3300-EX particle size distribution measuring equipment.

Filler in this description means an inorganic additive not contained in glass. Of materials such as crystalline powders, for example of alumina, forsterite, titanium oxide, bismuth oxide, ferrite, and barium titanate, one or more than one in mixture can be used. Furthermore, the amount of the filler in the organic powder is preferably 60% by weight or less, a preferred lower limit to filler content in the case in which filler is contained in the inorganic powder is 10% by weight, and a more preferred upper limit is 50% by weight.

The composition according to the present disclosure for forming a coating contains, with respect to 100 parts by weight of the composition for forming a coating, 5 parts by weight or more and 20 parts by weight or less (i.e., from 5 parts by weight to 20 parts by weight) of the first resin composition, 5 parts by weight or more and 20 parts by weight or less (i.e., from 5 parts by weight to 20 parts by weight) of the second resin composition, and 40 parts by weight or more and 65 parts by weight or less (i.e., from 40 parts by weight to 65 parts by weight) of the inorganic powder. A preferred lower limit to the first resin composition content is 6 parts by weight, a more preferred lower limit being 7 parts by weight, and a preferred upper limit is 15 parts by weight, a more preferred upper limit being 14 parts by weight. A preferred lower limit to the second resin composition content is 6 parts by weight, a more preferred lower limit being 7 parts by weight, and a preferred upper limit is 15 parts by weight, a more preferred upper limit being 14 parts by weight. A preferred lower limit to the inorganic powder content is 45 parts by weight, and a preferred upper limit is 60 parts by weight.

Furthermore, the composition according to the present disclosure for forming a coating preferably further contains a (meth)acrylate having three or more and six or less (i.e., from three to six) ethylenically unsaturated groups in one molecule. As such (meth)acrylate(s), compounds such as trimethylolpropane triacrylate (number of ethylenically unsaturated groups, 3), pentaerythritol triacrylate (number of ethylenically unsaturated groups, 3), pentaerythritol tetraacrylate (number of ethylenically unsaturated groups, 4), dipentaerythritol hexaacrylate (number of ethylenically unsaturated groups, 6), and modified forms thereof (ethylene-oxide-modified, propylene-oxide-modified, or caprolactone-modified ones), one or more than one in mixture, can be used.

The amount of the (meth)acrylate(s) having three or more and six or less ethylenically unsaturated groups in one molecule is preferably, with respect to 100 parts by weight of the composition for forming a coating, 10 parts by weight or more and 15 parts by weight or less (i.e., from 10 parts by weight to 15 parts by weight). A more preferred lower limit to this (meth)acrylate content is 11 parts by weight, an even more preferred lower limit being 11.5 parts by weight, and a more preferred upper limit is 14.5 parts by weight, an even more preferred upper limit being 14 parts by weight.

Furthermore, the composition according to the present disclosure for forming a coating preferably further contains a photopolymerization initiator. As photopolymerization initiator(s), compounds such as 2-benzyl-2-(dimethylamino)-1-(4-morpholinophenyl)-1-butanone; 1-hydroxy-cyclohexyl-phenyl-ketone; 2-hyrodxy-1-{4-[4-(2-hydroxy-2-methyl-propionyl)-benzyl)]phenyl}-2-methyl-propan-1-one; 2-methyl-1-(4-methylthiophenyl)-2-morpholinopropan-1-one; 2-(dimethylamino)-2-[(4-methylphenyl)methyl]-1-[4-(4-morpholinyl)phenyl]-1-butanone; bis(2,4,6-trimethylbenzoyl)-phenylphosphine oxide; 1,2-octane dione, 1-[4-(phenylthio)-, 2-(O-benzoyloxime)]; and ethanone, 1-[9-ethyl-6-(2-methyl benzoyl)-9H-carbazol-3-yl]-, 1-(0-acetyloxime), one or more than one in mixture, can be used.

Moreover, the composition according to the present disclosure for forming a coating preferably further contains a thermal curing initiator. Thermal curing initiators include compounds of azo series and organic peroxides, and examples of compounds of azo series include 2,2'-azobis (isobutyronitrile), 2,2'-azobis-(4-methoxy-2,4-dimethylvaleronitrile), and 2,2'-azobis(2,4-dimethylvaleronitrile), and examples of organic peroxides include (2-ethylhexanoyl) (tert-butyl) peroxide, 1,1-bis(1,1-dimethylethylperoxy)cyclohexane, and 1,1,3,3-tetramethylbutyl peroxy-2-ethylhexanoate.

Moreover, the composition according to the present disclosure for forming a coating may contain, as other components, one of materials such as organic additives, surfactants, dispersants, chelating agents, organic dyes, ultraviolet absorbers, polymerization inhibitors, and organometallic compounds or more than one in mixture. Examples of organic additives include materials such as graft polymers of maleic anhydride and styrene.

Furthermore, to make the composition for forming a coating into a paste, it is preferred to include solvent. As solvent(s), it is preferred to use a solvent of glycol ether series, and it is possible to one or more than one in mixture of solvents such as ethylene glycol monomethyl ether, ethylene glycol monomethyl ether acetate, propylene glycol monomethyl ether, propylene glycol monomethyl ether acetate, dipropylene glycol monomethyl ether, and dipropylene glycol monomethyl ether acetate.

With respect to 100 parts by weight of the composition for forming a coating, a preferred lower limit to solvent content is 5 parts by weight, and a preferred upper limit is 20 parts by weight. By increasing the solvent content, it is possible to reduce the viscosity of the composition for forming a coating. Moreover, since the lower the solvent content, the higher the proportion of the other components, a coating with a large dry film thickness can be formed.

For the composition according to the present disclosure for forming a coating, it is preferred that its viscosity be 10 Pa·s or more and 40 Pa·s or less (i.e., from 10 Pa·s or more and 40 Pa·s), and it is more preferred that the viscosity be 20 Pa·s or less. The viscosity mentioned here is the viscosity at a shear rate (share rate) of 0.01 $sec^{-1}$ as measured with a rheometer.

Moreover, the composition according to the present disclosure for forming a coating has, as a result of containing the second resin composition, a smaller difference between static viscosity and stirred viscosity. In particular, the static viscosity is small, contributing to the smoothing of the coating surface.

The composition according to the present disclosure for forming a coating can be produced by mixing the individual materials described above in predetermined proportions. Although the order and method of mixing are not particularly limited, an example is a method in which mixing and dispersion by using a triple-roll mill are performed.

The composition according to the present disclosure for forming a coating is capable of forming a coating through application by screen printing onto a substrate on which the manufacturer wants to form the coating and removal of the solvent by a drying method such as hot-air drying. When photocurability has been given to the composition according to the present disclosure for forming a coating, photocuring can be performed using a light source such as a high-pressure mercury lamp or an UV-LED (a light source that has its main peak at 365 nm is preferred) after drying.

When thermosetting properties have been given to the composition according to the present disclosure for forming a coating, thermal curing can be performed by, after drying, further carrying out heating at a thermal curing temperature.

An electronic component according to the present disclosure has an insulating layer that is a fired form of a composition according to the present disclosure for forming a coating. Examples of electronic components include a resistor, a capacitor, an inductor, a thermistor, an LC filter, an antenna, a temperature sensor, a circuit module, etc.

The following describes an example of an embodiment of an electronic component with reference to drawings, but the configuration of the electronic component and the method for producing the electronic component are not limited to the following. Note that the electronic component presented below is an example of a resistor component.

Figure 2:
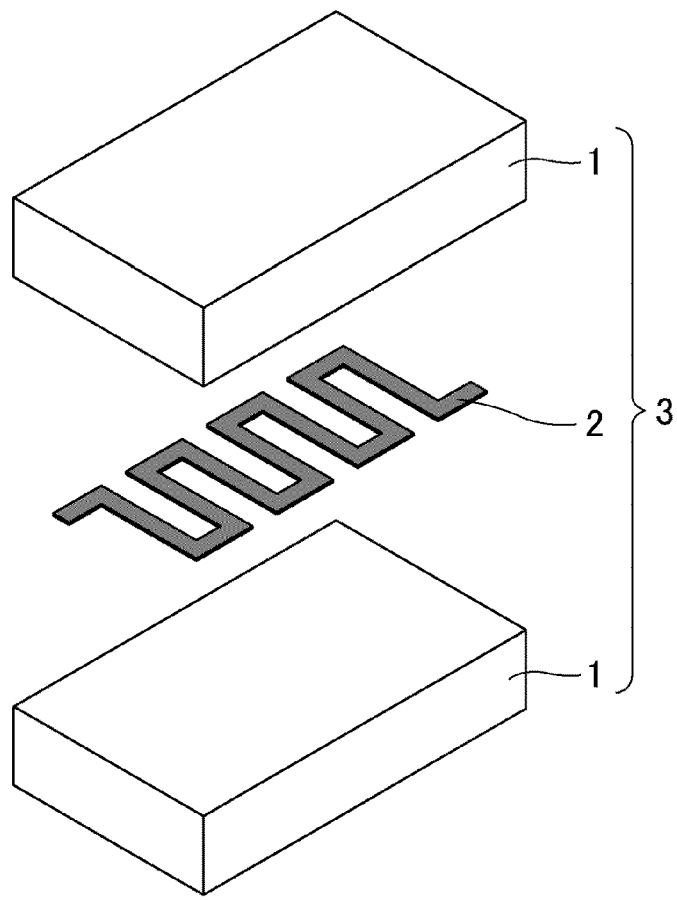
FIG. 2 is an exploded perspective view of a multilayer body that is part of the electronic component illustrated in FIG. 1.

FIG. 1 is a perspective diagram that schematically illustrates an example of an electronic component, and FIG. 2 is an exploded perspective view of a multilayer body that is part of the electronic component illustrated in FIG. 1. An electronic component 10 illustrated in FIG. 1 is composed of a multilayer body 3 and outer electrodes 4.

An example of a method for producing this multilayer body 3 is as follows. First, an insulating paste layer 1 is formed by applying a composition according to the present disclosure for forming a coating onto a support (not illustrated) by screen printing, drying it, and, in the case of a photocurable composition for forming a coating, exposing its entire surface to light. This is repeated multiple times as needed, forming the layer to a predetermined thickness.

Next, a wiring pattern 2 is formed by applying a conductor paste containing a metal powder onto the insulating paste layer 1 and drying it. As means for forming the wiring pattern 2, the photolithography method may alternatively be used.

Then, the formation of a wiring pattern 2 and the formation of an insulating paste layer 1 are repeated as needed, this is singulated into each individual device, and the support is peeled off. In this way, the multilayer body 3 is obtained.

After the obtained multilayer body 3 is sufficiently degreased, it is fired at 750 to 850° C. (top temperature) for 10 minutes to 1 hour. In this way, a fired multilayer body 3 is obtained. As a result of this firing, the insulating paste layer(s) 1, made from a composition according to the present disclosure for forming a coating, becomes insulating layer(s).

On opposite end portions of the obtained multilayer body 3, outer electrodes 4 electrically coupled to the wiring pattern(s) 2 are formed by a known method. In this way, an electronic component according to the present disclosure as illustrated in FIG. 1 is fabricated.

EXAMPLES

The following provides Examples in which a composition according to the present disclosure for forming a coating is disclosed more specifically. Note that the present disclosure is not limited only to these Examples.

(First Resin Composition)
As first resin compositions, the following were prepared. The weight-average molecular weight of each resin composition is approximately 3000:
Poly n-butyl acrylate (Tg: −54° C.)
Polyethyl acrylate (Tg: −24° C.)
Poly 2-ethylhexyl acrylate (Tg: −70° C.)
Polyoctyl acrylate (Tg: −65° C.)
Polynonyl acrylate (Tg: −58° C.)
Furthermore, as a resin composition to be used in Comparative Examples, polymethyl methacrylate (Tg: 8° C.) was prepared.

(Second Resin Compositions)
As second resin compositions, three resin compositions were prepared that were a compound in which methacrylic acid, methyl methacrylate, and octyl methacrylate had been copolymerized in a molar ratio of 1:1:1 and whose weight-average molecular weight was approximately 20000, a compound in which methacrylic acid, methyl methacrylate, and lauryl methacrylate had been copolymerized in a molar ratio of 1:1:1 and whose weight-average molecular weight was approximately 20000, and a compound in which methacrylic acid, methyl methacrylate, and benzyl methacrylate had been copolymerized in a molar ratio of 1:1:1 and whose weight-average molecular weight was approximately 20000.

Furthermore, as a resin composition to be used in Comparative Examples, a polyisobutyl methacrylate whose weight-average molecular weight was approximately 100000 was prepared.

(Glass Powder)
One with a composition, by mass ratio, of $SiO_2:B_2O_3:Na_2O:K_2O=80.0:15.0:1.0:4.0$ and a $D_{50}$ (arithmetic-mean particle diameter, median diameter) of 0.8 μm was used.

(Filler)
As filler, an alumina (aluminum oxide) powder with a $D_{50}$ (arithmetic-mean particle diameter, median diameter) of 0.5 μm was used.

(Acrylate Having Three or More and Six or Less (i.e., from Three to Six) Ethylenically Unsaturated Groups in One Molecule)
Trimethylolpropane triacrylate (number of ethylenically unsaturated groups, 3) was prepared. In each table, it is described as "Acrylate."

(Photopolymerization Initiator)
2-Benzyl-2-(dimethylamino)-1-(4-morpholinophenyl)-1-butanone was prepared.

(Organic Additive)
A graft polymer of maleic anhydride and styrene was prepared.
(Solvent)
Dipropylene glycol monomethyl ether was prepared.
(Examples 1 to 8 and Comparative Examples 1 and 2)
Materials prepared as above were weighed out on an electronic balance to be in the proportions indicated in Table 1, and the materials weighed out stirred in a planetary mixer and then dispersed with triple rolls. In this way, a composition for forming a coating was obtained.

Then, this composition for forming a coating was applied by screen printing onto a glass substrate of 200 mm square size using a screen plate of 550 mm square size for the outer frame and 190 mm square for the opening in which an SUS304 mesh with a mesh number of 100 (number of mesh per inch) and a wire diameter of 100 micrometers is used.

Subsequently, 95% or more of the solvent was removed by placing the substrate for 60 minutes in an oven of hot-air drying style set to 60° C.

When the surface roughness Rz (maximum height, JIS B0601:2001) and coating thickness of these coatings were measured using Keyence VK-8700 laser microscope (objective lens, X100), the results were as presented in Table 1. In Examples 1 to 8, it was possible to achieve smooth coating formation with Rz≤2 μm and a coating thickness of 50 μm or more at the same time. In contrast, in Comparative Examples 1 and 2, Rz≥5 μm and smooth coating formation was impossible.

Note that in Comparative Example 1, polymethyl acrylate (Tg: 8° C.) was used, and this is presented in the First resin composition column. Moreover, in Comparative Example 2, polyisobutyl methacrylate was used, and this is presented in the Second resin composition column.

That is, Comparative Example 1 is an example in which the first resin composition in a composition according to the present disclosure for forming a coating is not contained, and Comparative Example 2 is an example in which the second resin composition in a composition according to the present disclosure for forming a coating is not contained.

Figure 3:
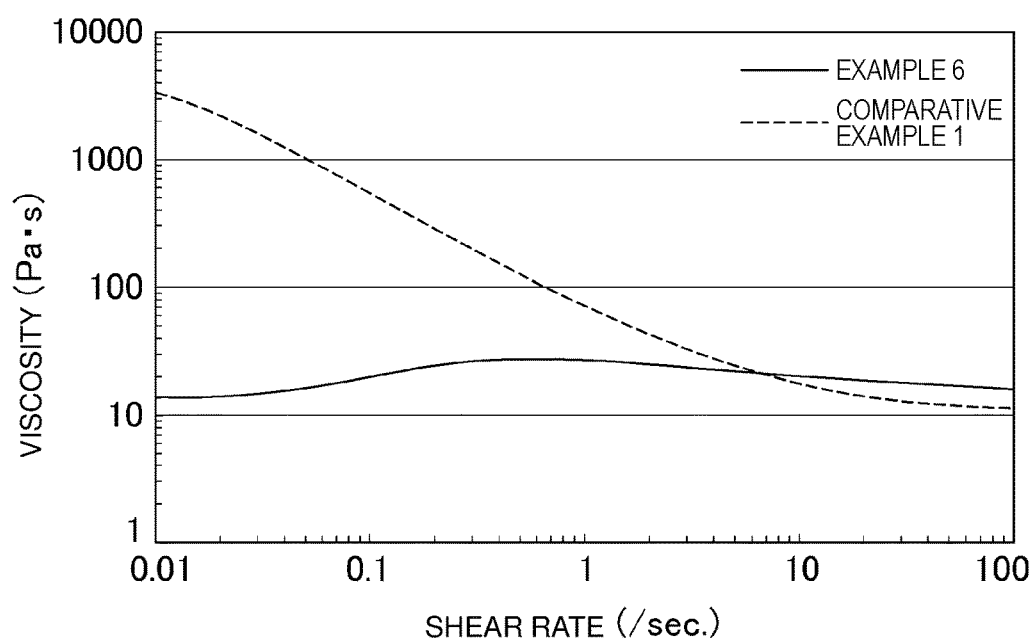
FIG. 3 is a graph that presents, for the compositions for forming a coating prepared in Example 6 and Comparative Example 1, the results of a measurement of viscosity with shear rate varied within the range of 0.01 to 100/sec.

(Viscosity Measurement)
The viscosity of the compositions for forming a coating prepared in Example 6 and Comparative Example 1 was measured with shear rate varied within the range of 0.01 to 100/sec. The results were presented in FIG. 3.

The composition in Example 6 for forming a coating exhibited stable viscosity despite varying shear rates. In contrast, with the composition in Comparative Example 1 for forming a coating, viscosity was high, particularly at low shear rates. It appears that because of this difference in the behavior of viscosity, the smoothness of coatings varies.

The measurement of viscosity was performed under the following conditions:
Equipment: A rheometer (model name, MCR-302; Anton-Paar)
Measuring jig: A cone plate with a diameter of 25 mm (part number: CP25-1)
Measuring temperature: 25° C.

Examples 9 to 13

In Examples 9 to 13, materials prepared as above were weighed out on an electronic balance to be in the proportions indicated in Table 2, and the materials weighed out stirred in a planetary mixer and then dispersed with triple rolls. In this way, a composition for forming a coating was obtained.

This was applied by screen printing and dried to remove the solvent in the same way as in Example 1, and then photocured with a light source having 365 nm at the main peak. In this way, a desired coating was obtained.

The compositions for forming a coating obtained in Examples 9 to 13 are compositions for forming a coating that contain an acrylate that has three or more and six or less (i.e., from three to six) ethylenically unsaturated groups in one molecule (hereinafter also referred to as a multifunctional acrylate) and a photopolymerization initiator. When the surface roughness Rz and coating thickness of these coatings were measured in the same way as in Example 1, the results were as presented in Table 2.

TABLE 1

| | First resin composition | | | Second resin composition | | | | | | |
|---|---|---|---|---|---|---|---|---|---|---|
| | Material | Tg (° C.) | Amount added (wt %) | Material | Amount added (wt %) | Glass powder (wt %) | Organic additive (wt %) | Solvent (wt %) | Surface roughness Rz (μm) | Coating thickness (μm) |
| Example 1 | Poly n-butyl acrylate | −54 | 10 | Polymer of methacrylic acid, methyl methacrylate, and octyl methacrylate | 15 | 56 | 1 | 18 | 1 | 50 |
| Example 2 | Polyethyl acrylate | −24 | 10 | Polymer of methacrylic acid, methyl methacrylate, and octyl methacrylate | 15 | 56 | 1 | 18 | 2 | 50 |
| Example 3 | Poly 2-ethylhexyl acrylate | −70 | 10 | Polymer of methacrylic acid, methyl methacrylate, and octyl methacrylate | 15 | 56 | 1 | 18 | 1 | 50 |
| Example 4 | Polyoctyl acrylate | −65 | 10 | Polymer of methacrylic acid, methyl methacrylate, and octyl methacrylate | 15 | 56 | 1 | 18 | 1 | 50 |
| Example 5 | Polynonyl acrylate | −58 | 10 | Polymer of methacrylic acid, methyl methacrylate, and octyl methacrylate | 15 | 56 | 1 | 18 | 1 | 50 |
| Example 6 | Poly n-butyl acrylate | −54 | 20 | Polymer of methacrylic acid, methyl methacrylate, and octyl methacrylate | 20 | 43 | 1 | 16 | 1 | 50 |
| Example 7 | Poly n-butyl acrylate | −54 | 10 | Polymer of methacrylic acid, methyl methacrylate, and lauryl methacrylate | 15 | 56 | 1 | 18 | 1 | 50 |
| Example 8 | Poly n-butyl acrylate | −54 | 10 | Polymer of methacrylic acid, methyl methacrylate, and benzyl methacrylate | 15 | 56 | 1 | 18 | 1 | 50 |
| Comparative Example 1 | Polymethyl acrylate | 8 | 10 | Polymer of methacrylic acid, methyl methacrylate, and octyl methacrylate | 15 | 56 | 1 | 18 | 5 | 50 |
| Comparative Example 2 | Poly n-butyl acrylate | −54 | 10 | Polyisobutyl methacrylate | 15 | 56 | 1 | 18 | 6 | 50 |

TABLE 2

| | First resin composition | | | Second resin composition | | | |
|---|---|---|---|---|---|---|---|
| | Material | Tg(° C.) | Amount added (wt %) | Material | Amount added (wt %) | Glass powder (wt %) | Acrylate (wt %) |
| Example 9 | Poly n-butyl acrylate | −54 | 5 | Polymer of methacrylic acid, methyl methacrylate, and octyl methacrylate | 5 | 65 | 15 |
| Example 10 | Poly n-butyl acrylate | −54 | 10 | Polymer of methacrylic acid, methyl methacrylate, and octyl methacrylate | 15 | 50 | 15 |
| Example 11 | Poly n-butyl acrylate | −54 | 6 | Polymer of methacrylic acid, methyl methacrylate, and octyl methacrylate | 9 | 55 | 14 |
| Example 12 | Poly n-butyl acrylate | −54 | 5 | Polymer of methacrylic acid, methyl methacrylate, and octyl methacrylate | 10 | 55 | 14 |
| Example 13 | Poly n-butyl acrylate | −54 | 5 | Polymer of methacrylic acid, methyl methacrylate, and octyl methacrylate | 10 | 58 | 10 |

| | Photopolymerization initiator (wt %) | Organic additive (wt %) | Solvent (wt %) | Surface roughness Rz (μm) | Coating thickness (μm) |
|---|---|---|---|---|---|
| Example 9 | 1 | 2 | 7 | 3 | 70 |
| Example 10 | 1 | 2 | 7 | 1 | 70 |
| Example 11 | 1 | 2 | 13 | 3 | 60 |
| Example 12 | 1 | 2 | 13 | 2 | 60 |
| Example 13 | 1 | 3 | 13 | 2 | 60 |

As a result of including a multifunctional acrylate and a photopolymerization initiator, it is possible to carry out the photocuring of the coating, and the obtained coating is a coating superior in waterproofness and solvent resistance. Furthermore, for the compositions for forming a coating obtained in Examples 9 to 13, it was possible to make the coating thickness as large as 60 to 70 μm as a result of the compositions being made to a formula in which the proportion of the solvent was small, and, for surface roughness, too, it was possible to make it within a smooth range, Rz≤3 μm.

Examples 14 to 18

In Examples 14 to 18, materials prepared as above were weighed out on an electronic balance to be in the proportions indicated in Table 3, and the materials weighed out stirred in a planetary mixer and then dispersed with triple rolls. In this way, a composition for forming a coating was obtained.

The compositions for forming a coating obtained in Examples 14 to 18 are compositions for forming a coating that contain filler (alumina) as inorganic powder. In Table 3, the proportion (% by weight) of the filler in the inorganic powder is presented as "Proportion of filler (%)."

When the surface roughness Rz and coating thickness of these coatings were measured in the same way as in Example 1, the results were as presented in Table 3. Table 3 also presents results for Example 1 as an example in which no filler is contained.

In Examples 14 to 18, it was possible to achieve smooth coating formation with Rz≤1 μm and a coating thickness of 50 μm or more at the same time, despite the inclusion of filler. Furthermore, although not measured, coating strength can be improved by including filler.

TABLE 3

| | First resin composition | | | Second resin composition | | Inorganic powder (wt %) | |
|---|---|---|---|---|---|---|---|
| | Material | Tg(° C.) | Amount added (wt %) | Material | Amount added (wt %) | Glass | Filler |
| Example 1 | Poly n-butyl acrylate | −54 | 10 | Polymer of methacrylic acid, methyl methacrylate, and octyl methacrylate | 15 | 56 | 0 |
| Example 14 | Poly n-butyl acrylate | −54 | 10 | Polymer of methacrylic acid, methyl methacrylate, and octyl methacrylate | 15 | 53.2 | 2.8 |
| Example 15 | Poly n-butyl acrylate | −54 | 10 | Polymer of methacrylic acid, methyl methacrylate, and octyl methacrylate | 15 | 44.8 | 11.2 |

TABLE 3-continued

| | | | | | | | | |
|---|---|---|---|---|---|---|---|---|
| Example 16 | Poly n-butyl acrylate | −54 | 10 | Polymer of methacrylic acid, methyl methacrylate, and octyl methacrylate | 15 | | 33.6 | 22.4 |
| Example 17 | Poly n-butyl acrylate | −54 | 10 | Polymer of methacrylic acid, methyl methacrylate, and octyl methacrylate | 15 | | 28 | 28 |
| Example 18 | Poly n-butyl acrylate | −54 | 10 | Polymer of methacrylic acid, methyl methacrylate, and octyl methacrylate | 15 | | 22.4 | 33.6 |

| | Proportion of filler (%) | Organic additive (wt %) | Solvent (wt %) | Surface roughness Rz (μm) | Coating thickness (μm) |
|---|---|---|---|---|---|
| Example 1 | 0 | 1 | 18 | 1 | 50 |
| Example 14 | 5 | 1 | 18 | 1 | 50 |
| Example 15 | 20 | 1 | 18 | 1 | 50 |
| Example 16 | 40 | 1 | 18 | 1 | 50 |
| Example 17 | 50 | 1 | 18 | 1 | 50 |
| Example 18 | 60 | 1 | 18 | 1 | 50 |

What is claimed is:

1. A coating composition comprising:
from 5 parts by mass to 20 parts by mass of a first resin composition;
from 5 parts by mass to 20 parts by mass of a second resin composition; and
from 40 parts by mass to 65 parts by mass of an inorganic powder, wherein
the first resin composition is a poly(meth)acrylate with a glass transition temperature Tg of ≤−20° C.,
the second resin composition has at least one structure represented by following formula (1) and at least one structure represented by following formula (2),

[Chem. 1]

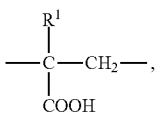

(1)

[Chem. 2]

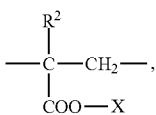

(2)

$R^1$ and $R^2$ are each independently a hydrogen atom or a methyl group, and
X is a substituent other than a hydrogen atom.

2. The coating composition according to claim 1, wherein X is either a structure having a benzene ring or an alkyl group having eight or more carbon atoms.

3. The coating composition according to claim 1, wherein a weight-average molecular weight of the second resin composition is 50000 or less.

4. The coating composition according to claim 1, further comprising a (meth)acrylate having from three to six ethylenically unsaturated groups in one molecule.

5. The coating composition according to claim 1, further comprising a photopolymerization initiator.

6. The coating composition according to claim 1, wherein the inorganic powder is composed of glass and filler, and a proportion that the filler accounts for in the inorganic powder is 60% by weight or less.

7. An electronic component comprising an insulating layer made of the coating composition according to claim 1 through firing.

8. The coating composition according to claim 2, wherein a weight-average molecular weight of the second resin composition is 50000 or less.

9. The coating composition according to claim 2, further comprising a (meth)acrylate having from three to six ethylenically unsaturated groups in one molecule.

10. The coating composition according to claim 3, further comprising a (meth)acrylate having from three to six ethylenically unsaturated groups in one molecule.

11. The coating composition according to claim 2, further comprising a photopolymerization initiator.

12. The coating composition according to claim 3, further comprising a photopolymerization initiator.

13. The coating composition according to claim 4, further comprising a photopolymerization initiator.

14. The coating composition according to claim 2, wherein the inorganic powder is composed of glass and filler, and a proportion that the filler accounts for in the inorganic powder is 60% by weight or less.

15. The coating composition according to claim 3, wherein the inorganic powder is composed of glass and filler, and a proportion that the filler accounts for in the inorganic powder is 60% by weight or less.

16. The coating composition according to claim 4, wherein the inorganic powder is composed of glass and filler, and a proportion that the filler accounts for in the inorganic powder is 60% by weight or less.

17. The coating composition according to claim 5, wherein the inorganic powder is composed of glass and filler, and a proportion that the filler accounts for in the inorganic powder is 60% by weight or less.

18. An electronic component comprising an insulating layer made of the coating composition according to claim 2 through firing.

19. An electronic component comprising an insulating layer made of the coating composition according to claim 3 through firing.

20. An electronic component comprising an insulating layer made of the coating composition according to claim 4 through firing.

* * * * *